United States Patent [19]
Weber

[11] Patent Number: 5,802,982
[45] Date of Patent: Sep. 8, 1998

[54] ROLL CONTROL MECHANISM FOR SWING MOTION TRUCK

[75] Inventor: Hans B. Weber, Rotonda West, Fla.

[73] Assignee: NACO, Inc., Downers Grove, Ill.

[21] Appl. No.: 916,881

[22] Filed: Aug. 22, 1997

[51] Int. Cl.$^6$ .................................................. B01F 5/24
[52] U.S. Cl. ................. 105/187; 105/190.1; 105/198.1; 105/208
[58] Field of Search ................... 105/171, 187, 105/190.1, 190.2, 191, 197.05, 198, 198.1, 199.2, 208, 208.1, 208.2

[56] References Cited

U.S. PATENT DOCUMENTS

| | | | |
|---|---|---|---|
| 3,313,245 | 4/1967 | Sundby | 105/197.05 |
| 3,461,814 | 8/1969 | Weber et al. | 105/193 |
| 3,670,660 | 6/1972 | Weber et al. | 105/171 |
| 4,593,828 | 6/1986 | Hanula et al. | 213/62 R |
| 5,027,716 | 7/1991 | Weber et al. | 105/187 |
| 5,241,913 | 9/1993 | Weber | 105/208 |
| 5,463,964 | 11/1995 | Long et al. | 105/187 |

*Primary Examiner*—S. Joseph Morano
*Attorney, Agent, or Firm*—Lee, Mann, Smith, McWilliams, Sweeney & Ohlson

[57] ABSTRACT

A roll control mechanism for use with a swing motion railway car truck. The control mechanism comprises a transom stop adapted to be attached to the transom of the truck. The transom stop includes a convex cylindrical surface having a tip that is adapted to engage a bolster stop attached to the bolster of the truck to limit lateral movement of the side frames of the truck. The convex cylindrical surface of the transom stop provides a low point of contact between the tip of the transom stop and the bolster stop thereby reducing the magnitude of the overturning movement created by such contact.

11 Claims, 4 Drawing Sheets

5,802,982

ROLL CONTROL MECHANISM FOR SWING MOTION TRUCK

BACKGROUND OF THE INVENTION

The present invention is directed to an optimized roll control mechanism for a swing-motion railway car truck such as disclosed in U.S. Pat. Nos. 3,461,814 and 3,670,660.

The swing-motion railway car truck assemblies disclosed in the above-identified patents have proven extremely successful and have provided a degree of operating efficiency not previously achieved. The swing-motion truck was designed to lower the critical speeds at which periodic track disturbances could cause resonance conditions with the sprung car body, and, therefore uncontrolled car body hunting. One object of the design of the swing motion railway car truck was to provide a railway car truck having embodied therein a positive means to check and control excessive roll amplitudes of an associated car body. The design was also to provide a car truck for high capacity, high center of gravity railway freight car use of the type in which a lateral transom stop extending from the transom interconnects with the side frames to limit the side frames from swinging transversely of the truck excessively in which the effect of the laterally directed forces applied to the lateral transom stop of the truck is reduced to provide safer operation of the car. The roll control feature of the swing motion truck functioned on the basis of reducing the overturning moment imposed on the unsprung truck by the rolling car body.

On a standard freight car truck, the lateral translation of the rolling car body forces the bolster gibs against the side frame columns at an average height of approximately 20¼ inches from the top of the rail (t.o.r.). Closed bolster gibs help stop further roll motion of the car body-bolster assembly with a lateral force imposed at 20¼ inches from the top of the rail. This arrangement provides for an overturning moment, equaling 20¼ inches multiplied by the lateral force, which can unload or even lift the wheel off the track on the opposite side of the truck. The swing motion truck as disclosed in the above patents does not have a bolster gib but has lateral stops on the bottom of the bolster and the transom. With this construction, even with the tilt of the bolster relative to the transom being ±2.2 degrees, because of a 1½ inch compression of load springs on one side of the truck and 1½ inches of extension of load springs on the other side of the truck, the lateral force applied to the unsprung truck is at a level of 11⅝ inches above the top of the rail. This results in a much lower overturning moment, which is 11⅝ inches multiplied by the lateral force, than on the standard truck having bolster gibs. The present invention provides a further improvement.

SUMMARY OF THE INVENTION

The present invention is directed to a railway car truck comprising a pair of side frames having a bolster extending therebetween, and an unsprung member wherein the side frames are rockably supported on the ends of the truck axles in such a manner that the frames may function as swing hangers and the unsprung member extends between and interconnects the frames to limit and ultimately stop the swing hanger type action of the frames. The lateral forces of the bolster are applied to the side frames at a location disposed substantially below the level of both the side frame-axle rocking connection and the bolster for reducing the overturning moment and maintaining sufficient amount of vertical load on the wheels of the truck to avoid wheel lift. The point at which the lateral load is applied to the side frame is determined by the point of contact on a face wall of a transom lateral stop. The lowered point of contact on the lateral stop reduces the overturning moment during car roll to a minimum. This invention optimizes the use of lateral stops used to lower the overturning moment imposed on the unsprung truck by the rolling car.

DETAILED DESCRIPTION OF THE PREFERRED EMBODIMENT

Figure 1A:
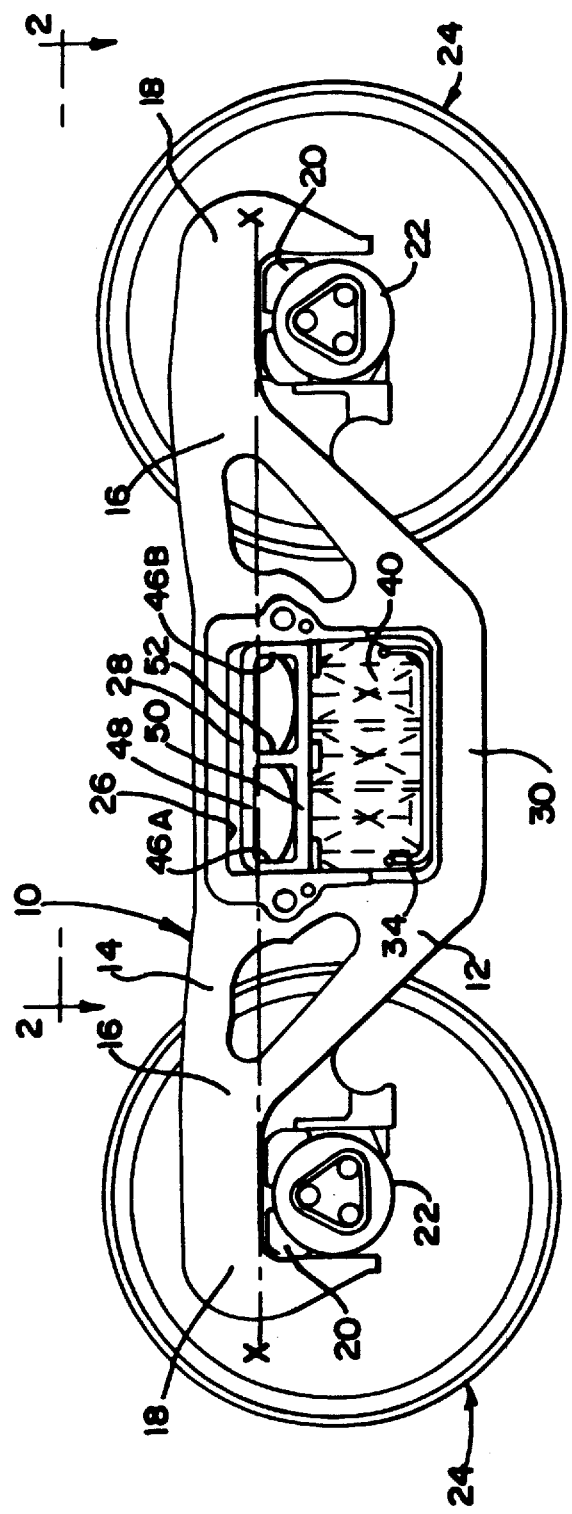
FIG. 1A is a side elevational view of a swing motion railway car truck having a constant damped configuration.
Figure 1B:
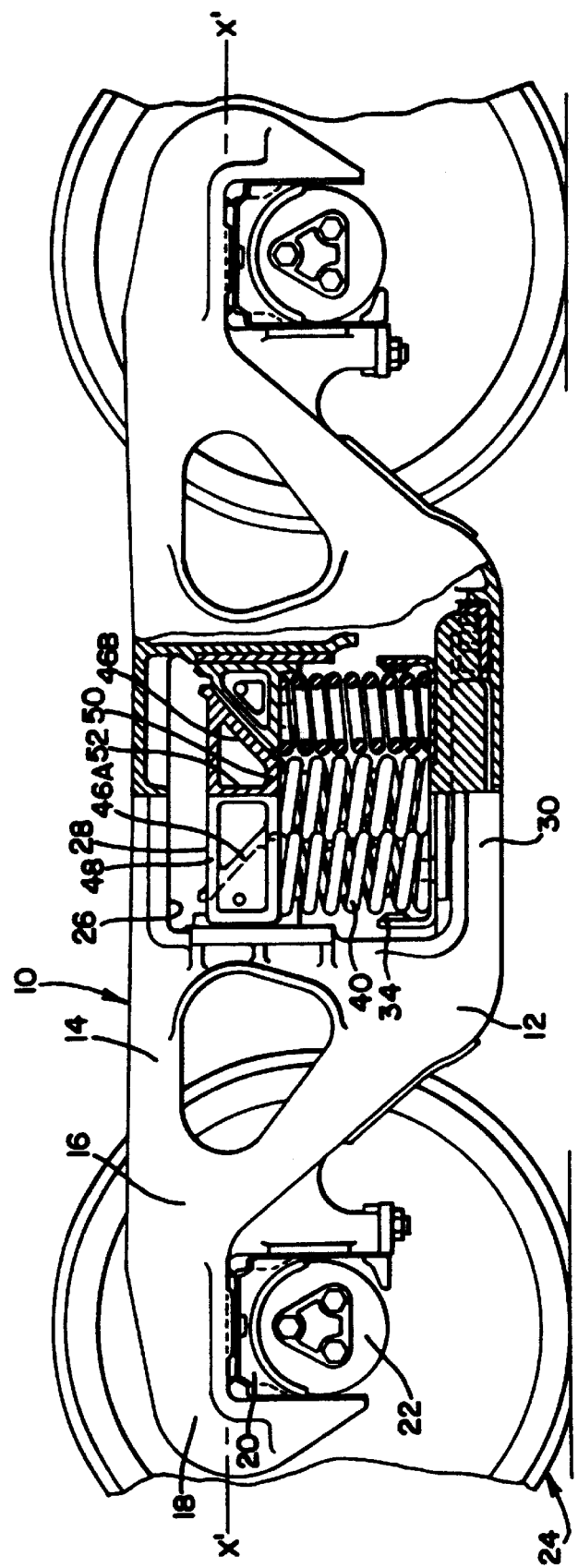
FIG. 1B is a partial side elevational view, shown partially in cross section, of a swing motion railway car truck having a variable damped configuration.

FIG. 1A shows a swing motion truck having a constant damped configuration as disclosed in U.S. Pat. No. 3,461,814. FIG. 1B shows a swing motion truck having a variable damped configuration as disclosed in U.S. Pat. No. 3,670,660. The present invention may be used in connection with both of these swing motion trucks. Common elements of the trucks as shown in FIGS. 1A and 1B are referenced with common reference numbers. The trucks of FIGS. 1A and 1B each comprise a side frame 10 having a tension member 12 and a compression member 14. The members 12 and 14 merge at junction 16 to provide a pedestal jaw 18 for receiving an adapter 20 and a bearing assembly 22 that receives a journal of a wheel and axle assembly 24. A bolster receiving opening 26 is located at the center of the side frame 10. Opening 26 receives one end of a bolster 28 arranged with its longitudinal axis transverse to the length of the frame 10. It will be understood that while only one side frame 10 has been shown in the drawings, there is a similar side frame on the other side of the car truck, which cooperates with the bolster and other parts of the truck in like manner.

Figure 3:
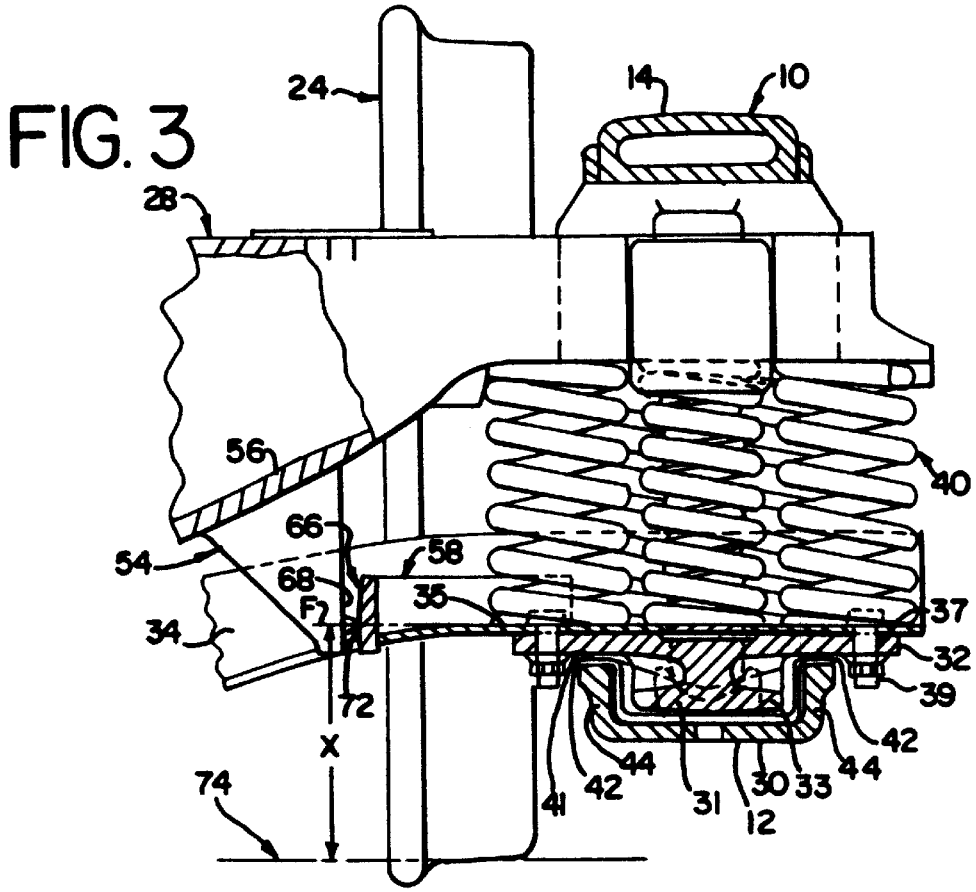
FIG. 3 is a fragmentary end view, partially in section, taken along line 3—3 of FIG. 2 showing the lateral transom stop of the present invention.

As shown in FIG. 3, the tension member 12 includes a U-shaped base portion 30 for partially housing a rocker seat 31. The rocker seat 31 comprises an elongated plate section 32 and a depending inverted T-shaped strengthening member 33. The elongated plate 32 provides a seat for supporting the end of a transom 34. Rocker seat 31 provides a top surface 37 for supporting a channel-shaped end of the transom 34 arranged with its longitudinal axis transverse to the length of the frame 10 and parallel to the axis of bolster 28. Transom 34 is interconnected to rocker seat 31 by bolts 39 extending through openings in the rocker seat 31 and transom 34 and/or tight fitting bosses extending from the rocker seat top surface 37 through apertures in the transom connecting thus the two side frames 10 together. A spring group 40 is disposed between transom 34 and bolster 28 for resiliently supporting the end of the bolster 28. Excessive swinging of the side frames 10 in either a positive or negative lateral direction is stopped by contact between an under surface 41 of the rocker plate 32 and top surface 42 of one of the side walls 44 of the base portion 30 of the tension member 12.

The bolster 28 as illustrated in FIG. 3 is generally of box-shape construction with each end comprising side walls 46A and 46B. Spaced top and bottom walls 48 and 50 structurally join side walls 46A and 46B. A vertical central wall 52 joining the top and bottom walls 48 and 50 reinforces the bolster ends.

As seen in FIG. 3, relative transverse movement of the bolster 28 with respect to the side frames 10 is limited by a pair of horizontally spaced bolster stops 54 (only one shown) which are disposed along the longitudinal axis of the bolster 28. Each bolster stop 54 depends from a bottom wall 56 of the bolster 28 and is in spaced opposed relation with a lateral transom stop 58 carried by the transom 34 intermediate its ends. Each cooperating bolster stop 54 and lateral transom stop 58 are spaced apart so as to provide a clearance therebetween to permit limited lateral movement of the bolster 28 transversely of the truck in addition to the lateral movement generated by the swinging of the frames 10. The engagement between each cooperating bolster stop 54 and lateral transom stop 58 will occur at a level substantially below the horizontal plane X—X (shown in FIG. 1) and the horizontal plane X'—X' (shown in FIG. 1B) containing the rockable connection defined between the adapter 20 and pedestal jaw 18. This type of connection normally allows the side frame 10 of the truck to swing transversely of the truck.

Figure 2:
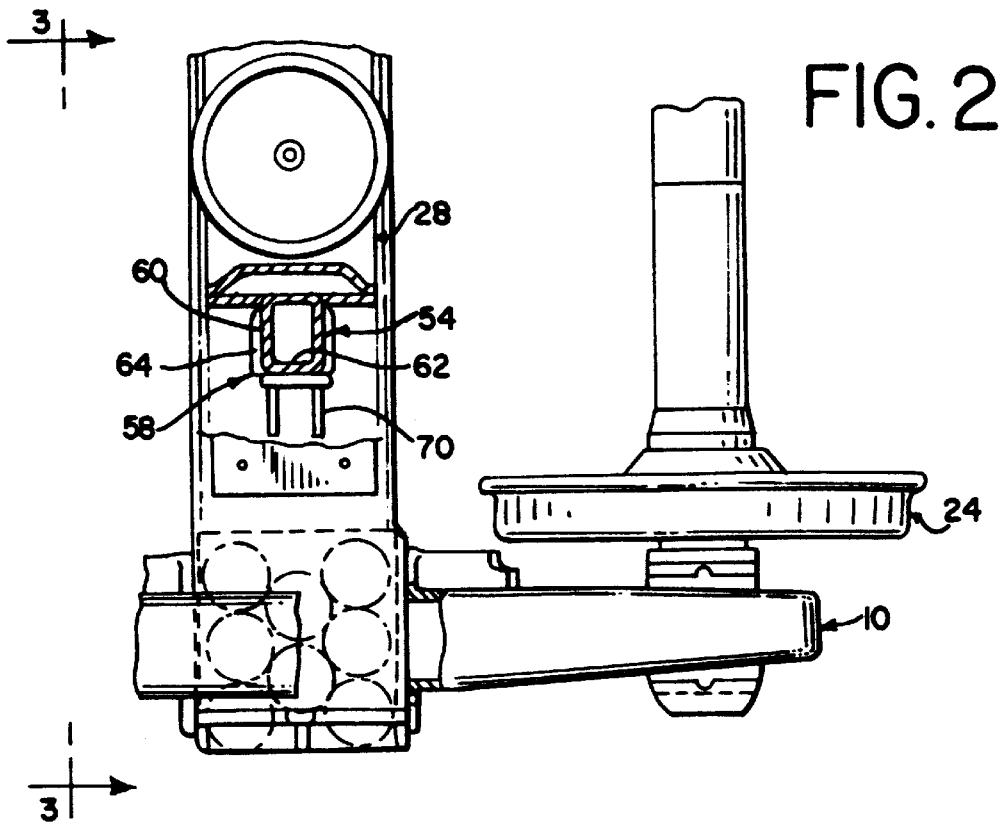
FIG. 2 is a fragmentary plan view, partially in section, taken along line 2—2 of FIG. 1A.

Bolster stop 54 comprises a U-shaped member 60 best shown in FIG. 2 having a vertical, transversely extending wall 62 facing the adjacent end of the bolster 28. In the assembled position of the truck, transom 34 is provided with an opening 64 extending longitudinally thereof for receiving the bolster stop 54. At the outer end of the opening 64 is a convex engagement surface 66, best shown in FIG. 6, of lateral transom stop 58 in opposed relation to engagement surface 68 of bolster stop 54. As seen in FIG. 2, the engagement surface 66 is supported and reinforced by support members such as ribs 70. Each rib 70 includes a lower surface 71 that is in contact with the transom spring seat 35.

Figure 4:
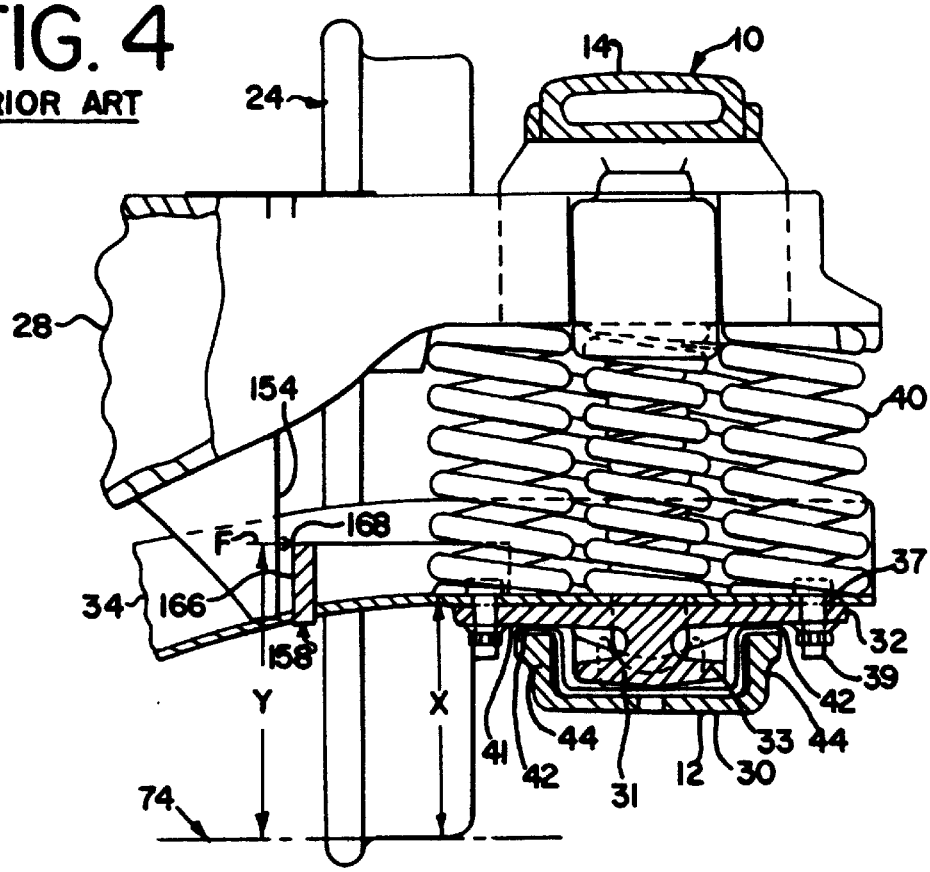
FIG. 4 is a fragmentary end view, partially in section, showing a lateral transom stop of the prior art.

FIG. 4 shows a prior art swing motion truck having a lateral transom stop 158 with a flat vertical engagement surface 166. Having such a surface 166 on the lateral transom stop 158 causes the lateral force F that is applied by a bolster stop 154 to the transom stop 158 to be concentrated at the top 168 of the transom stop engagement surface 166 when the bolster stop 154 makes lateral contact with the transom stop engagement surface 166. The force F and the top 168 of the transom stop engagement surface 166 are located a distance "Y" above the top of rail 74.

Figure 5:
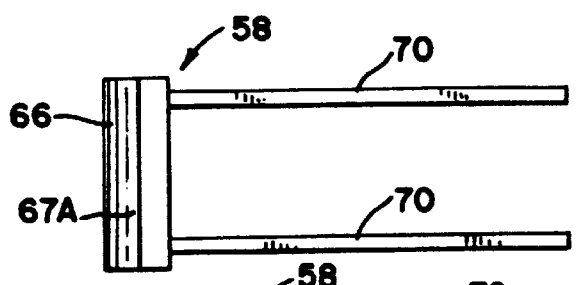
FIG. 5 is a top plan view of the lateral transom stop of the present invention.
Figure 6:
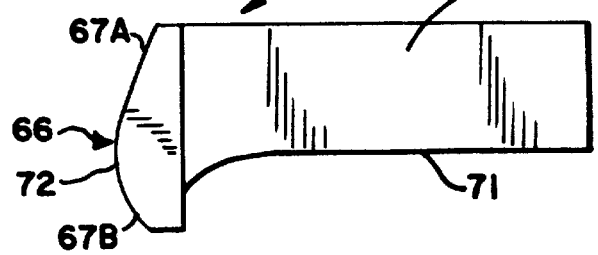
FIG. 6 is a side elevational view of the lateral transom stop.
Figure 7:
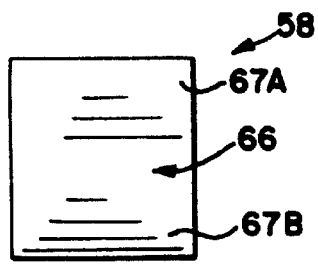
FIG. 7 is a front elevational view of the lateral transom stop.

FIG. 3 shows a swing motion truck having a lateral transom stop 58 with a contact wall having a cylindrical convex contact surface 66 (also shown in FIGS. 5–7). The lateral transom stop 58 includes an upper edge surface 67A and a lower edge surface 67B. The contact surface 66 extends between the upper edge surface 67A and the lower edge surface 67B. The shape of the contact surface 66 causes the lateral force F transferred from the bolster stop 54 of the bolster 28 to be concentrated at the laterally outermost point or tip 72 of the convex contact surface 66. The line of contact between the bolster stop 54 and the transom stop 58 at the tip or contact point 72 is approximately located at the same vertical level as the bottom of the load springs in the spring group 40, which is at the same vertical height as the top of the transom spring seat 35, a distance "X" above the top of the rail 74. The distance X is less than the distance Y and equals about 9⅝ inches. This line of contact will be on the cylindrical convex contact surface 66 of the lateral transom stop 58. The radius of the cylindrical contact surface 66 is centered at the top of the transom spring seat 35 and bottom surface 71 of the ribs 70. The top and bottom contact surfaces 67A and 67B recede at an angle of at least seven degrees away from the bolster stop 54 and toward the nearest side frame 10. Compared to the prior art transom stop 158 having a flat lateral transom contact surface 166 where the lateral force F is applied at a higher height from the top of the rail 74 at the slightest tilt of the bolster, this truck having a transom stop 58 with a convex contact surface 66 presents a reduction in height above the top of the rail 74 at which the lateral force F is transferred, thereby reducing the overturning moment of the truck.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A railway car truck comprising:
    a pair of side frames journaled on associated wheel and axle assemblies for swinging movement transversely of the truck under the action of laterally directed forces applied to the truck, each said frame having a bolster receiving opening;
    a bolster extending between said side frames, each end of said bolster being received in said opening of a respective side frame for movement of said bolster transversely of said side frame;
    a transom extending between said side frames in interlocking relationship therewith for limiting the transverse swinging movement of said side frames;
    a lateral bolster stop extending from said bolster adapted to transmit lateral forces from said bolster to said transom;
    a lateral transom stop extending from said transom adapted to be contacted by said bolster stop to limit lateral movement of said bolster and transmit lateral forces from said bolster to said transom;
    said transom stop defining an upper edge surface and a lower edge surface, and a convex contact surface extending between said upper edge surface and said lower edge surface, said convex contact surface including a contact point, said contact point adapted to be engaged by said bolster stop.

2. The railway car truck of claim 1 wherein said convex contact surface defines a cylindrical surface on which said contact point is located.

3. The railway car truck of claim 1 wherein said transom includes a transom spring seat, said contact point being centered at said transom spring seat.

4. The railway car truck of claim 1 wherein said upper edge surface is disposed at an angle of at least seven degrees relative to said bolster stop.

5. The railway car truck of claim 4 wherein said lower edge surface is disposed at an angle of at least seven degrees relative to said bolster stop.

6. A transom stop for use with a railway car truck having a transom, a bolster and a bolster stop, said transom stop comprising:

a contact wall having a convex contact surface, said convex contact surface including a tip adapted to contact the bolster stop to limit lateral movement of the bolster; and a support member attached to said contact wall, said support member adapted to engage the transom.

7. The transom stop of claim 6 wherein said contact wall includes an upper edge surface and a lower edge surface, said convex contact surface extending between said upper edge surface and said lower edge surface.

8. The transom stop of claim 7 wherein said upper edge surface is disposed at an angle of at least seven degrees to a line tangent to said convex contact surface at said tip.

9. The transom stop of claim 7 wherein said lower edge surface is disposed at an angle of at least seven degrees to a line tangent to said convex contact surface at said tip.

10. The transom stop of claim 6 wherein said support member includes a lower surface adapted to engage the transom, said tip of said convex contact surface being located generally coplanar with said lower surface of said support member.

11. The transom stop of claim 6 wherein said convex contact surface is generally cylindrical.

* * * * *